United States Patent [19]

Edwards et al.

[11] 4,170,287

[45] Oct. 9, 1979

[54] MAGNETIC AUGER

[75] Inventors: Donald W. Edwards, Wilmington; Richard D. Kinard, Newark; Theodore J. Wirbisky, Wilmington, all of Del.; Richard J. Angelucci, Glenolden, Pa.

[73] Assignee: E. I. Du Pont de Nemours and Company, Wilmington, Del.

[21] Appl. No.: 788,671

[22] Filed: Apr. 18, 1977

[51] Int. Cl.² .............................................. B65G 33/00

[52] U.S. Cl. .................................... 198/657; 198/690; 222/DIG. 1; 355/3 DD

[58] Field of Search ............... 198/619, 657, 662, 669, 198/690; 415/10; 222/DIG. 1; 355/3 DD; 118/657, 658; 366/190, 266, 297, 300, 318; 427/47, 48

[56] References Cited

U.S. PATENT DOCUMENTS

| | | | |
|---|---|---|---|
| 3,338,374 | 8/1967 | Dudley | 198/690 |
| 3,553,832 | 1/1971 | Knechtel | 118/657 |
| 3,557,751 | 1/1971 | Kushima | 118/657 |
| 3,777,707 | 12/1973 | Hodges | 118/657 |

FOREIGN PATENT DOCUMENTS

| | | | |
|---|---|---|---|
| 882074 | 5/1953 | Fed. Rep. of Germany | 198/690 |
| 1218287 | 6/1966 | Fed. Rep. of Germany | 118/658 |
| 2353229 | 4/1975 | Fed. Rep. of Germany | 355/3 DD |
| 380031 | 4/1973 | U.S.S.R. | 355/3 DD |

*Primary Examiner*—Joseph E. Valenza

[57] ABSTRACT

A magnetic auger in the form of a cylinder having one or more magnetic helices in the surface thereof is disclosed for transporting ferromagnetic particles such as toner particles used in magnetography.

19 Claims, 8 Drawing Figures

MAGNETIC AUGER

BACKGROUND OF THE INVENTION

Transporting particulate ferromagnetic material at a controlled rate, ordinarily performed by standard mechanical augers, is complicated by agglomoration of the particles and by binding of the screw auger in its enclosing tube by material packing into the clearances between the tips of the flight and the inner surface of the tube and by packing into the auger itself ultimately forming a cylinder with no further forwarding.

SUMMARY OF THE INVENTION

The magnetic auger of the present invention eliminates the flights of a conventional auger thereby eliminating the packing problem described above. The magnetic auger is a smooth surfaced cylinder having one or more magnetic helices structured therein. The magnetic auger rotates fully or partially immersed in a sump of particulate magnetic material or powder forwarding that powder in a manner controlled by the hand of the magnetic helix, the direction and speed of rotation and the degree of immersion.

BRIEF DESCRIPTION OF THE DRAWING

Referring now to FIG. 1, a tray 71 is partially filled with particulate ferromagnetic powder 72, such as a toner employed in magnetographic reproduction, forming a powder sump 73. A magnetic auger 74 is partially immersed in sump 73 and turns in the direction of the superimposed arrow. Agitators 76 and 77 are used to stir the ferromagnetic particles 72 to prevent agglomeration in sump 73. Powder 72 is forwarded parallel to the axial direction of roll 74 the end toward which it is moved depending on the hand of the magnetic helix on the surface of roll 74 formed by magnetic lines 92 which are best shown in FIG. 2.

Figure 1:
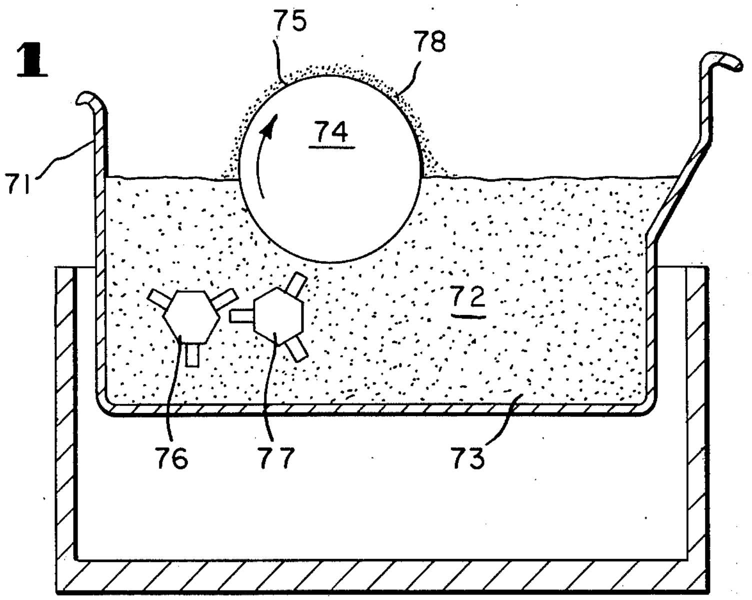
FIG. 1 is a cross-sectional elevation of the magnetic auger of the present invention disposed as a forwarding device for ferromagnetic powder.
Figure 2:
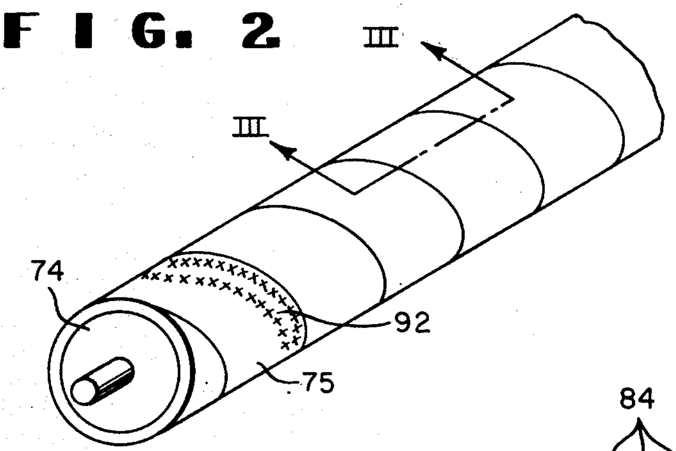
FIG. 2 is a perspective view of the magnetic auger shown in FIG. 1.
Figure 3:
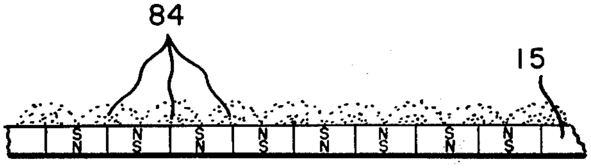
FIG. 3 is a cross-section of the roll covering 75 taken on line III—III of FIG. 2.

A preferred construction of magnetic auger 74 is shown in FIG. 2. In this instance magnetic auger 74 is fabricated by surfacing a suitably journalled roll with a helically wound strip of magnetic elastomeric or magnetic polymeric sheet material 75 to form a smooth circumferential surface as shown in FIGS. 1 and 2. Such flexible magnetic sheet materials are well-known and commercially available. The preferred sheet material is permanently magnetized and has a pressure sensitive adhesive on one side. The preferred sheet material has alternating north-south magnetic poles through the thickness and spaced about 8 to the inch as shown in FIG. 3. In order to obtain the desired pitch for the magnetic helices it is preferred that the lines of magnetization be oriented parallel to the long dimension of the strip of magnetic sheet being used to form the magnetic auger. We use a 2-inch (5 cm) wide strip on a 2-inch (5 cm) diameter roll. Thus, when the strip 75 is helically wound around auger 74, sixteen magnetic helices are created. Strips of magnetic sheet with lines transverse to the long dimension of the strips form interrupted helices which, while workable are less preferred.

Figure 4:
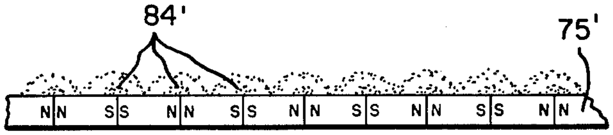
FIG. 4 is a cross-section of the roll covering 75 taken on line III—III of FIG. 2 showing an alternate mode of magnetization.

As shown in FIG. 3, the particulate ferromagnetic material forms raised bands 84 over the intersections of the magnetic poles which are helically disposed about the auger. The ferromagnetic material closest to the pole intersection of magnetic material is the most tightly bound. In FIG. 3 this is indicated schematically by density of shading. The magnetic force of the material 75 is sufficiently high so that these bands 84 act as integral structural parts of the auguer 74. As auger 74 rotates, bands 84 are carried around the auger 74 acting like the flights of a mechanical auger. The interaction of the helical disposition of the magnetic poles of the flexible magnetic material 74 carrying the bands 84 and the ferromagnetic particles 72 in the sump 73 produces a forwarding force parallel to the rotational axis of the auger. The direction of this force, of course, depends on the direction of rotation and the hand of the helical wrap. The magnitude of the pumping action so provided varies directly with the revolutions per minute of the auger and with the immersion of the auger in the ferromagnetic particles. The rotating magnetic auger partially immersed in a sump of ferromagnetic particles is capable of moving the ferromagnetic particles in a controllable direction at a controllable rate. The magnetic auger, despite its essentially cylindrical geometry, acts as though it were formed in typical screw fashion and the bands of particles 84 act like screw flights. While in FIG. 3 there is shown magnetization through the thickness of the covering material, strip 75, and this is commercially available, the invention is not restricted to this mode of magnetization. In FIG. 4 is shown magnetization in the plane of the surface 75'. Raised bands of particulate magnetic material 84' form over the N—N and S—S helical junctions. Similarly the helical magnetization could be created by winding permanent magnetic wire around a cylinder or induced in the surface of a suitably fabricated ferromagnetic roll.

We believe these magnetic bands do not pack because any agglomeration of material locally breaks the magnetic band relieving further compacting forces and the band then reforms.

Figure 5:
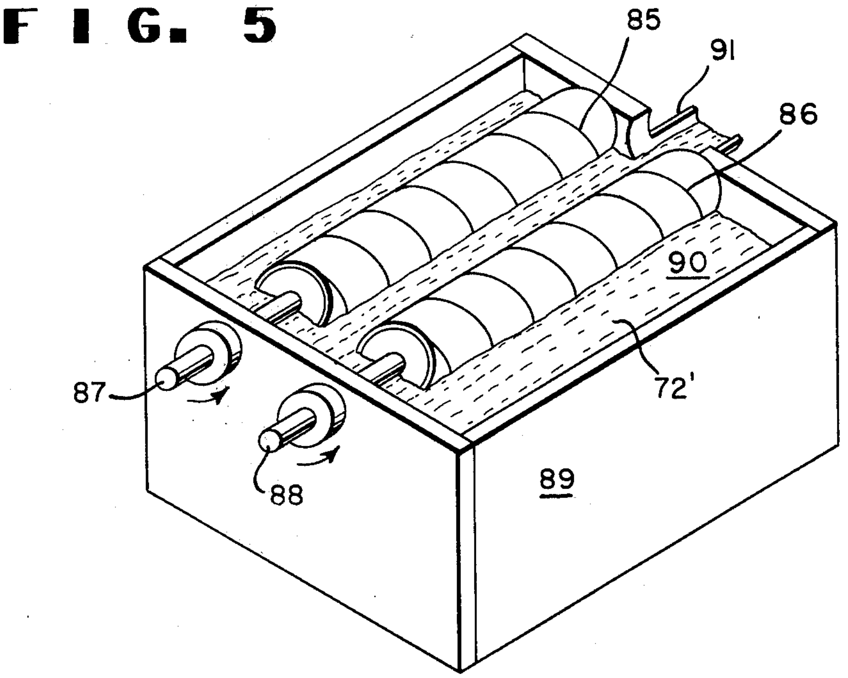
FIG. 5 is a perspective view of two magnetic augers employed as a forwarding device for ferromagnetic material.

Referring now to FIG. 5, two magnetic augers 85 and 86 are disposed side by side mounted on shafts 87 and 88 respectively which are suitably journalled in bearings at both ends of tray 89 partially filled with ferromagnetic particles 72 forming a sump 90 in which rolls 85 and 86 are partially immersed. Rolls 85 and 86 are covered with helically wound strips of flexible magnetic sheeting as described above and the helices are of identical hand. Shafts 87 and 88 are rotated at identical rotational speed by means not shown in the same direction as indicated by the arrows such that the forwarding forces generated on the powder 72 are in the direction of spout 91 forcing powder 72 out of sump 90 via spout 91 at a rate controlled by the rpm of shafts 87 and 88. Means not shown are employed to replenish sump 90. By using opposite hand helices and opposite direction rotation the same result can be achieved.

Figure 6:
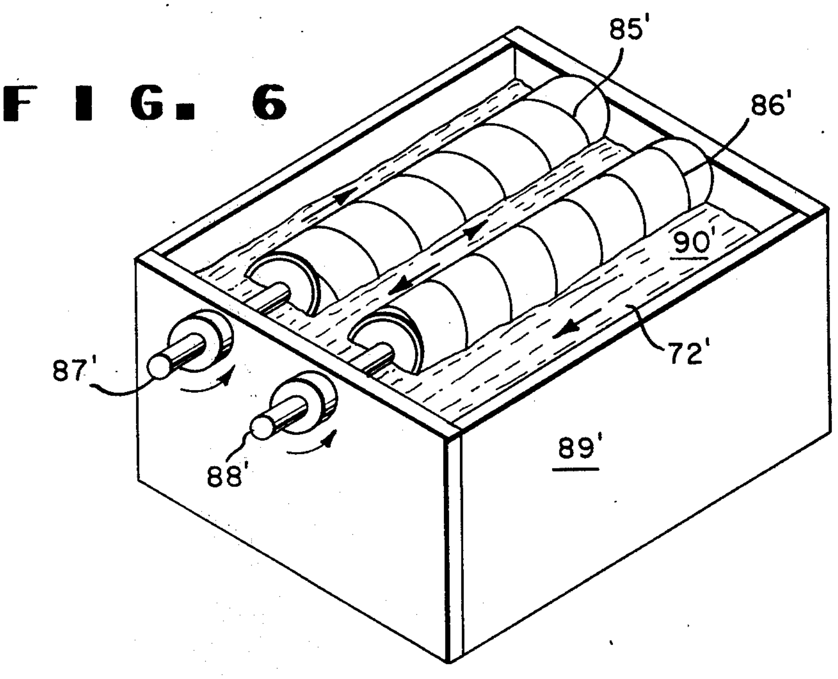
FIG. 6 is a perspective view of two magnetic augers employed as a leveling device for a sump of ferromagnetic materials. magnetic augers

Referring now to FIG. 6, magnetic rolls 85′ and 86′ are surfaced with opposite hand helices of flexible magnetic sheeting and are disposed side-by-side mounted on shafts 87′ and 88′ respectively, which are suitably journalled in bearings at both ends of tray 89′ partially filled with ferromagnetic particles 72′ forming a sump 90′ in which rolls 85′ and 86′ are partially immersed. Shafts 87′ and 88′ are rotated at identical rotational speed by means not shown in the same direction as shown by the arrows on the shafts. Forces are generated on the powder 72′ such that a circulation is created in sump 90′ as shown by the arrows. The rate of circulation at any point along the magnetic augers is, of course, proportional to the degree of immersion. Therefore, if by means not shown powder is added at any point in sump 90′, the augering action will level the surface with the high spots being pumped faster than the low. Similarly if powder is removed from a location on the surface of sump 90′, the augering action will level the resultant hollow.

Figure 7:
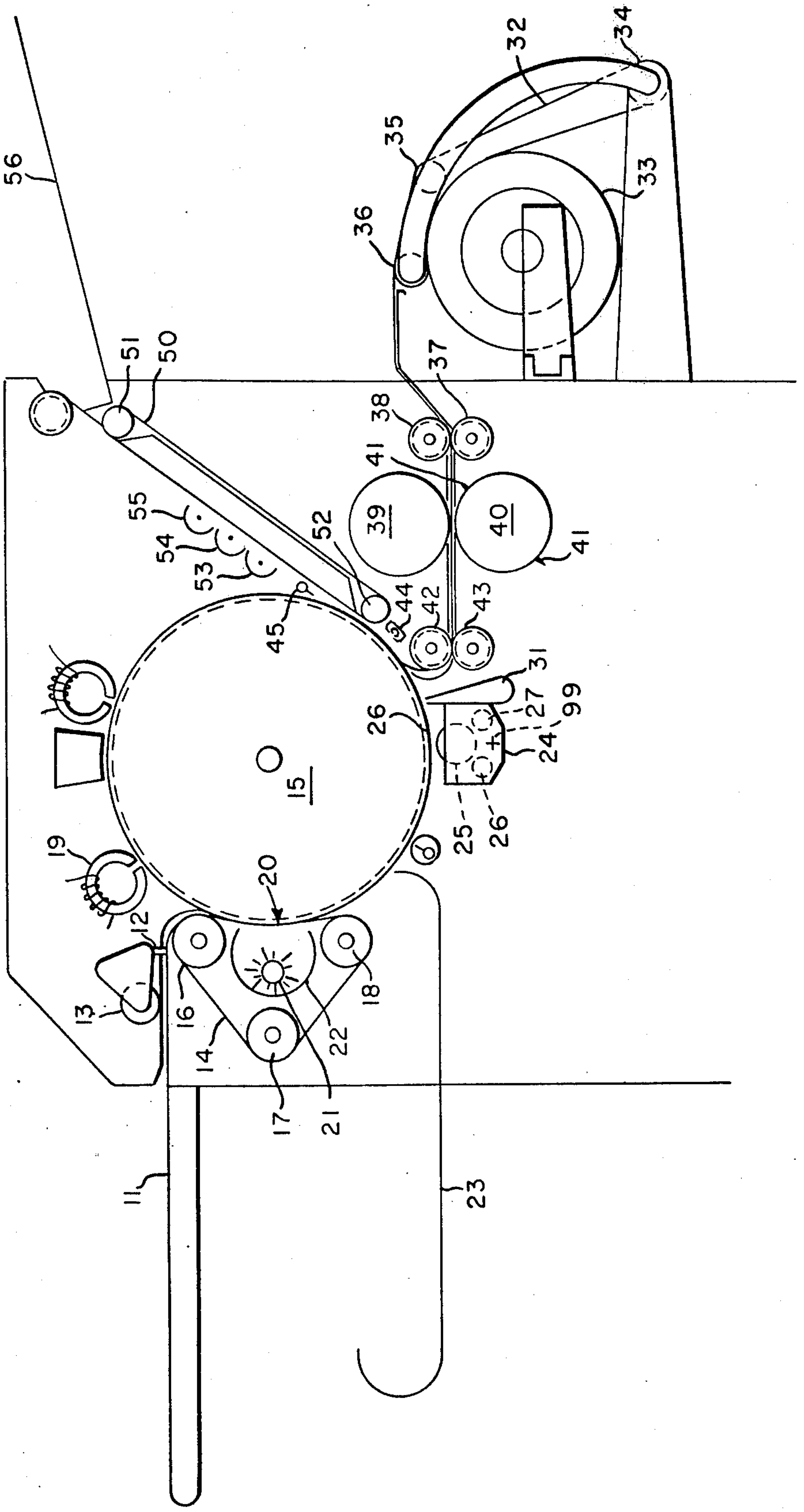
FIG. 7 is a schematic view of one embodiment of a printer using the magnetic auger of the present invention.
Figure 8:
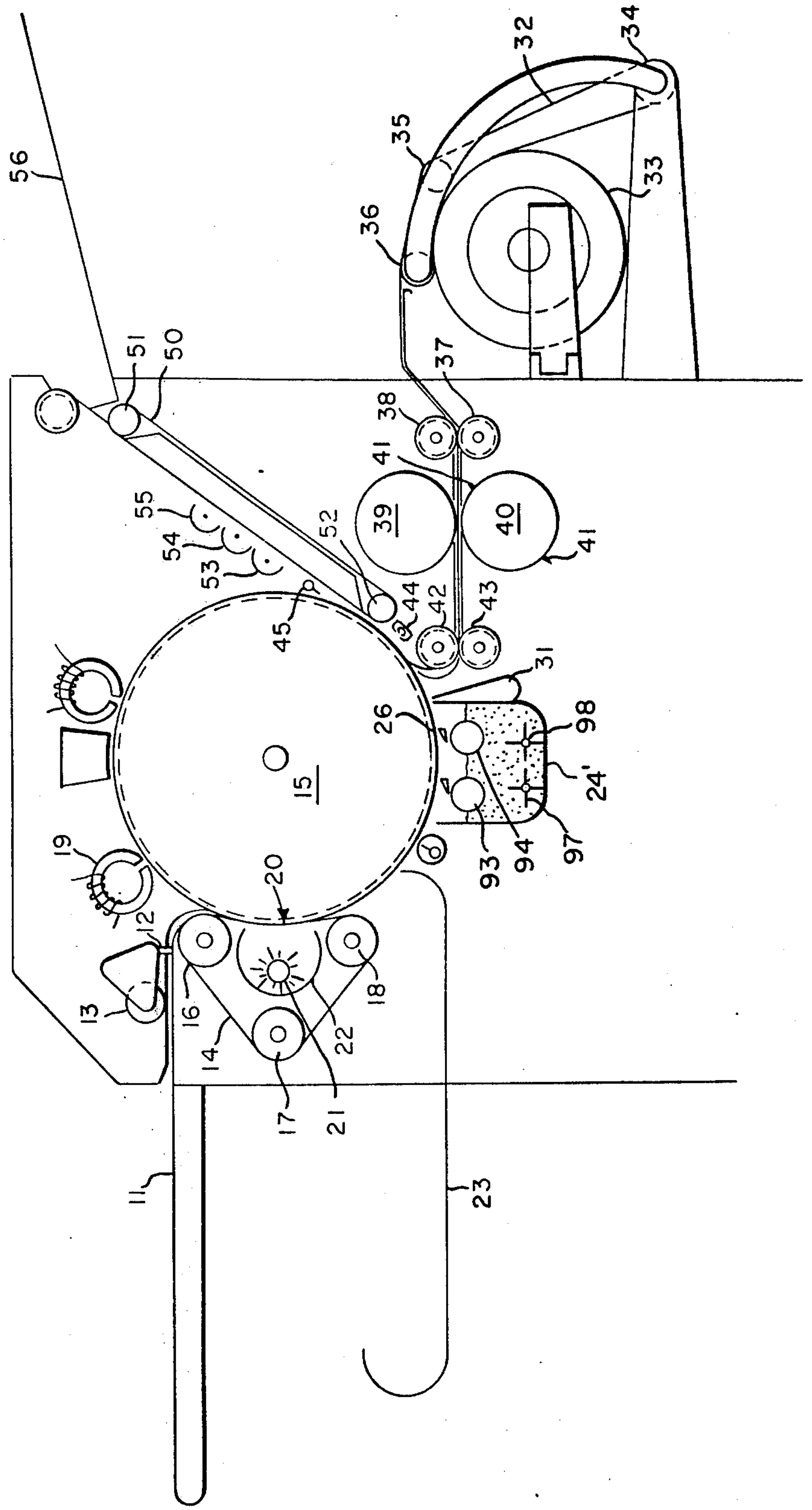
FIG. 8 is a schematic view of our preferred embodiment showing our preferred use of the augers as combined magnetic rolls and leveling devices.

Referring to FIGS. 7 and 8 a translucent document such as an engineering drawing which is to be copied is placed on shelf 11 and urged against gate 12. The copier is then activated to lift gate 12 and lower feed roll 13 into contact with the document. Feed roll 13 feeds the document into the nip between endless belt 14 and drum 15. Endless belt 14 is made of a transparent film such as poly(ethylene terephthalate) film and is guided by rolls 16, 17 and 18. The surface of drum 15 may also be such a film coated with an electrically conductive layer which is grounded. The surface of the electrically conductive layer is coated with a layer of ferromagnetic material having a Curie point of from 25° to 500° C. such as acicular chromium dioxide in an alkyd or other suitable binder.

Drum 15 rotates in a counterclockwise direction. The ferromagnetic coating on the drum is uniformly magnetized by premagnetizer 19, which records a periodic pattern. From 250 to 1500 magnetic reversals per inch on the magnetizable surface is a suitable working range with from 300 to 600 magnetic reversals per inch being preferred. Then the magnetized drum surface in contact with the document is moved past exposure station indicated generally at 20. The exposure station consists of lamp 21 and reflector 22. The surface of drum 15 is exposed stepwise until the entire document has been recorded as a latent magnetic image on the surface of drum 15. The chromium dioxide as used herein has a Curie temperature of about 116° C. The various indicia such as pencil lines and printing on the document being copied shade the areas of chromium dioxide over which such indicia is situated during exposure thereby preventing their reaching the Curie point. Thus, after exposure, the surface of drum 15 will have magnetized areas of chromium dioxide corresponding to the indicia-bearing areas of the document being copied, other areas not so shaded being demagnetized.

After exposure, the document being copied is dropped into tray 23.

The imagewise magnetized drum 15 is rotated past a toner decorator described below. The toner is a fine powder of a magnetic material such as iron oxide encapsulated in a thermoplastic resin having a relatively low softening point of from 75° to 120° C. The toner generally will have an average particle size of from 10 to 30 microns. A vacuum knife 31 is used to remove whatever toner particles may have adventitiously become attached to the demagnetized areas of the chromium dioxide on the surface of drum 15. The paper 32 on which the copy is to be made is fed from roll 33 around idler rolls 34, 35, and 36 to feed rolls 37 and 38. Backing roll 39 cooperates with roll 40 equipped with cutting edges 41. Rolls 39 and 40 are activated by means not shown to cut the paper to the same length as the length of the document being copied. The paper is then fed into physical contact with the surface of drum 15 by rolls 42 and 43. The paper 32 in contact with the surface of drum 15 is fed past corona discharge device 44. Corona discharge device 44 preferably is of the type known as a Corotron which comprises a corona wire spaced about 11/16″ from the paper and a metal shield around about 75 percent of the corona wire leaving an opening of about 90° around the corona wire exposed facing paper 32. The metal shield is insulated from the corona wire. The metal shield is maintained at ground potential. Generally the corona wire will be from 0.025 to 0.25 mm in diameter and will be maintained at from 3000 to 10,000 volts. The corona wire may be at either a negative or positive potential with negative potential being preferred. The corona discharge from the wire charges the backside of the paper. Upon leaving the transfer zone adjacent corona discharge device 44 said toner particles are held image-wise on paper 32. There is only a light amount of pressure between paper 32 and the surface of drum 15 (i.e., merely enough to hold them adjacent each other). The pressure between paper 32 and drum 15 is essentially entirely generated by the electrostatic attraction generated by corona discharge device 44. The paper 32 is then removed from the surface of drum 15 by the action of vacuum belt 50 in conjunction with the action of puffer 45 that forces it onto the surface of endless vacuum belt 50 driven by rollers 51 and 52. The paper 32 is then fed under fusers 53, 54, and 55 which heat the thermoplastic resin encapsulating the ferromagnetic material in the toner particles causing them to melt and fuse to the paper 32. The decorated paper is then fed into tray 56.

Referring now to FIG. 7, where a pair of magnetic augers 25′ and 27, acting in conjunction, one having a left-hand helix and the other a right-hand helix, are employed in trough 24 which contains ferromagnetic toner. Therein the magnetic augers are totally immersed and act to stir the toner and to distribute and redistribute the toner while standard magnetic roll 25 applies the toner to the latent image on the surface of drum 15. By using helices of the same hand and opposite direction rotation the same result can be achieved. One or more rotary agitators 99 keep the toner in a free flowing condition.

Referring now to FIG. 8, two magnetic augers, 93 and 94, partially immersed in toner and acting in conjunction, one having a left-hand helix and the other a right-hand helix are employed in trough 24′ which contains ferromagnetic toner particles. The magnetic augers turn in the same direction driven by means not shown. Therein the magnetic augers act to distribute and redistribute ferromagnetic toner particles and also to level the surface of elongated trough 24′. They simultaneously act as the conventional magnetic brush rolls known in the art and are shown raising toner to doctor blades 95 and 96 which strip toner from the rolls and fluidize it into waves of toner as described in our copending application Ser. No. 788,668, filed Apr. 18, 1977. In this instance a pair of screw augers used previously for the distributing-leveling function was replaced at a considerable saving of cost and space, along with a reduction in complexity of mechanism especially drive components. This also eliminates the tendency for the screw augers to become packed with toner and thus becoming inoperative through the apparent ability of the magnetic auger to relieve any local excess pressure as described previously. In applications of the type disclosed herein, it is necessary to maintain the sump of ferromagnetic particles in a free-flowing condition which is accomplished by mechanical agitators 97 and 98. Additional parallel augers may be employed for this distributing-leveling function in sumps having an extended surface.

The cylindrical auger of this invention can also replace a mechanical auger in a tube providing ferromagnetic particles are being forwarded. These should be drawn from a fluidized or well agitated sump. Such auger-in-tube devices are common in feeders. The cylindrical auger of this invention has a considerably reduced tendency to jam when so used because material does not pack into permanent screw flights and particularly because there is no close clearance between screw-flight tips and the wall of the enclosing tube which in prior art devices is a source of jamming.

We claim:

1. A device for transporting ferromagnetic particles comprising a sump of ferromagnetic particles, at least one horizontally disposed magnetic auger immersed in said sump which magnetic auger comprises a smooth surfaced rotatable cylinder having at least one line of permanent magnetic material forming a magnetic helix on the surface of said rotatable cylinder with ferromagnetic particles magnetically adhered to said magnetic helix to form flights which act like a mechanical auger.

2. The device of claim 1 wherein there are two parallel magnetic augers in the sump each adapted to urge the ferromagnetic particles in the same direction parallel to the axis of said augers.

3. The device of claim 2 wherein there are two magnetic augers in the sump adapted to be rotated in the same direction at about the same speed, both magnetic augers having magnetic helices of the identical hand.

4. The device of claim 1 wherein there are two magnetic augers in the sump adapted to be rotated in the same direction at about the same speed, said magnetic augers having magnetic helices of the opposite hand.

5. The device of claim 2 wherein the lines of permanent magnetic material on the magnetic augers have their north-south poles on opposite surfaces of a sheet of material mounted on the surface of the cylinders forming the magnetic augers.

6. The device of claim 2 wherein the lines of permanent magnetic material on the magnetic augers have their north-south poles on the surface of the cylinders forming the magnetic augers.

7. A sump of ferromagnetic particles having immersed therein a pair of parallel horizontally disposed magnetic augers each of which magnetic augers comprises a smooth surfaced rotatable cylinder having at least one line of permanent magnetic helix on the surface of said rotatable cylinder with ferromagnetic particles magnetically adhered to said magnetic helix to form flights which act like a mechanical auger, said magnetic augers being adapted to urge the ferromagnetic particles in opposite directions.

8. The sump of claim 7 wherein the magnetic augers are adapted to be rotated in the same direction at about the same speed, said magneticaugers having magnetic helices of the opposite hand.

9. The sump of claim 7 wherein the magnetic augers are adapted to be rotated in the opposite direction at about the same speed, both magnetic augers having magnetic helices of the same hand.

10. The sump of claim 7 wherein the lines of permanent magnetic material on the magnetic augers have their north-south poles on opposite surfaces of a sheet of material mounted on the surface of the cylinders forming the magnetic augers.

11. The sump of claim 7 wherein the lines of magnetic material on the magnetic augers have their north-south poles on the surface of the cylinders forming the magnetic augers.

12. A process wherein at least one horizontally mounted smooth surfaced cylindrical magnetic auger having at least one helix of permanent magnetic material in the cylindrical surface thereof is rotated while at least partially immersed in a sump of magnetic particles whereby a portion of said magnetic particles become magnetically adhered to said magnetic helix to form flights which act like a mechanical auger and said magnetic particles are transported axially along said cylindrical magnetic auger.

13. The process of claim 12 wherein the magnetic auger is fully immersed in the magnetic particles.

14. The process of claim 12 wherein there are two parallel magnetic augers immersed in the sump of magnetic particles cooperating to advance the magnetic particles in one direction parallel to the axis of said augers.

15. The process of claim 14 wherein both magnetic augers are rotated in the same direction at about the same speed, both magnetic augers having magnetic helices of the same hand.

16. The process of claim 14 wherein the magnetic augers are rotated in the opposite direction at about the same speed, said magnetic augers having magnetic helices of the opposite hand.

17. The process of claim 13 wherein there are two parallel magnetic augers immersed in the sump of magnetic particles cooperating to level the magnetic particles by each auger advancing the magnetic particles in opposite directions which directions are parallel to the axis of said augers.

18. The process of claim 17 wherein both magnetic augers are rotated in the same direction at about the same speed, said magnetic augers having magnetic helices of the opposite hand.

19. The process of claim 17 wherein said magnetic augers are rotated in the opposite direction at about the same speed, both magnetic augers having magnetic helices of the same hand.

* * * * *